S. J. TENNAL.
SAND AND SLIME SEPARATOR.
APPLICATION FILED FEB. 23, 1911.

1,004,105. Patented Sept. 26, 1911.

WITNESSES:
N. M. Wiley
Esther M. Engstrom.

Samuel J. Tennal INVENTOR

BY
L. L. Westfall his ATTORNEY

UNITED STATES PATENT OFFICE.

SAMUEL J. TENNAL, OF WALLACE, IDAHO.

SAND AND SLIME SEPARATOR.

1,004,105.  Specification of Letters Patent.  Patented Sept. 26, 1911.

Application filed February 23, 1911. Serial No. 610,434.

*To all whom it may concern:*

Be it known that I, SAMUEL J. TENNAL, citizen of the United States of America, residing at Wallace, in the county of Shoshone and State of Idaho, have invented certain new and useful Improvements in Sand and Slime Separators, of which the following is a specification.

My invention relates to an apparatus for the separation of sand and other solids from a mixture of water and slime consisting of a mixture of water and small particles of lead or other valuable minerals. In the concentration of ores containing lead and other valuable minerals by the gravity system whereby water is used to carry off the lighter substance, such as crushed rock, sand and the like, small particles of lead and other precious metals of great value are carried away by the water and lost.

It is the object of this invention to save these values by providing a process whereby the solids may be separated from the slime consisting of water and particles of precious metals, allowing the particles of precious metals to then settle and then to draw off the water and preserve the metals for treatment.

The invention consists in a mechanism whereby the slime and solids are conveyed together into a separation tank filled to overflowing and whereby by gravity the heavier parts or solids have a tendency to settle to the bottom of the tank and the slime to rise and over-flow and whereby the same is forced to pass through a heavy wire mesh of a grade of approximately from 120 to 200 according to the character of the solids to be separated from the slime and then conveyed into a settling tank where the water and metals are separated by means of gravity.

Figure 1:
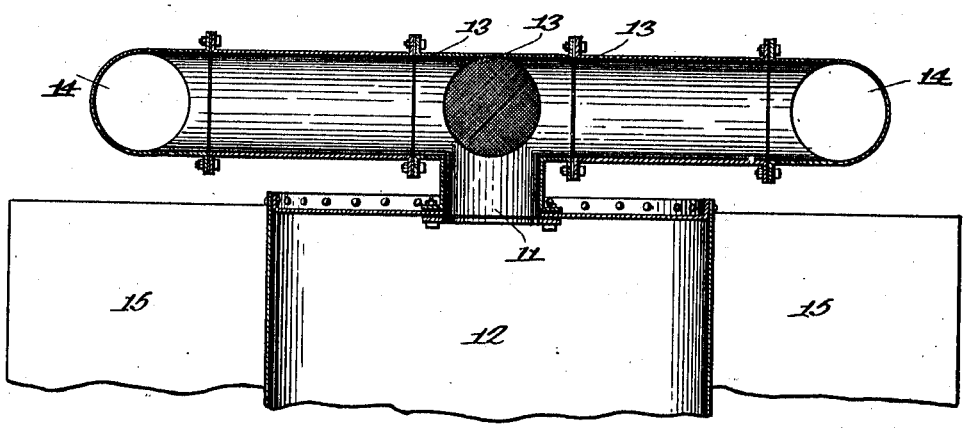
Figure 2:
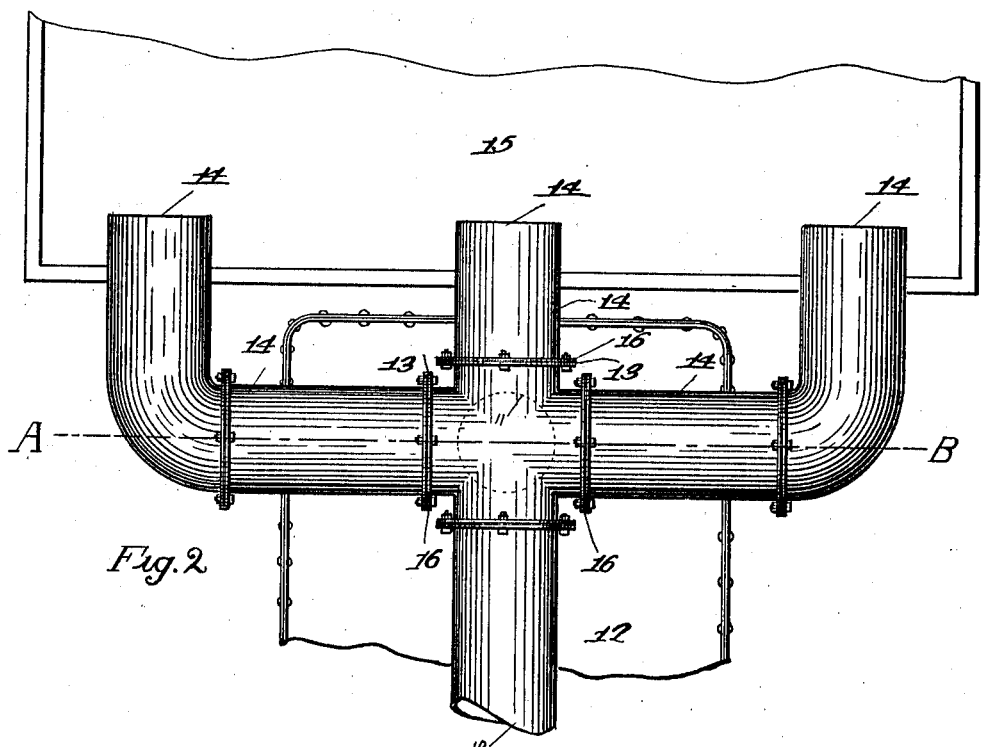

With reference to the drawings, Figure 1 is a section of the separating mechanism, with however, only a broken away portion of the separation and settling tanks shown, taken on the line A—B of Fig. 2 and Fig. 2 is a plan view of the same.

The mixture of solids and slime is conveyed through the supply pipe 10 to and through the pipe 11 into the separating tank 12. When the tank 12 is filled to overflowing the lighter parts of the mixture rise to the top thereof and return upward through the pipe 11 and are forced to find their escape through the wire mesh 13 in the pipes 14 and are conveyed by the said pipes 14 to the settling tank 15. The wire mesh 13 in the pipes 14 is placed near the outer walls of the upright pipe 11 in order that the solids washed against the wire mesh and unable to pass through the same may be washed back and downward through the pipe 11 into the separating tank 12 by the movement of the water. The wire mesh 13 crossing the entire openings in the pipes 14 are placed at the flange joints 16 and may be removed for cleaning, repairing, or for other purposes. I prefer the use of the flange joint as mentioned above and also for the securing of the pipe 11 to the top of the separation tank 12 in order to give proper stability to the connections and enable them to resist the gravity pressure of a heavy feed through the supply pipe 10.

It is understood that this apparatus is for the use of treating large quantities of material such as would be supplied by concentrators treating hundreds of tons of ore per day. In course of time the separation tank 12 will become so filled with solids that it will be necessary to empty the same. The settling tank 15 may be divided into apartments in order that a portion may be settling while the others are being supplied with the mixture of water and metals.

It is understood that either wood, metal or earthen pipes may be used to convey the materials to be treated from the source of supply to the separating device and may be of various sizes or styles.

Having thus described my invention, what I claim as new and useful and desire to secure by Letters-Patent is:—

In combination, a closed water tight receptacle, a conduit upstanding from the top of said receptacle, a feed conduit connected to said upstanding conduit, discharging conduits diverging from said upstanding conduit, screens across said discharging conduits in proximity to said upstanding conduit, the feed and discharging conduits being relatively so disposed that material from the feed conduit passes over the opening of the upstanding conduit before reaching the discharge conduits.

In testimony whereof I have affixed my signature in presence of two witnesses.

SAMUEL J. TENNAL.

Witnesses:
C. B. BRADFORD,
ESTHER M. ENGSTROM.

Copies of this patent may be obtained for five cents each, by addressing the "Commissioner of Patents, Washington, D. C."